INFRARED SPECTRUM OF GARLANDOSUS

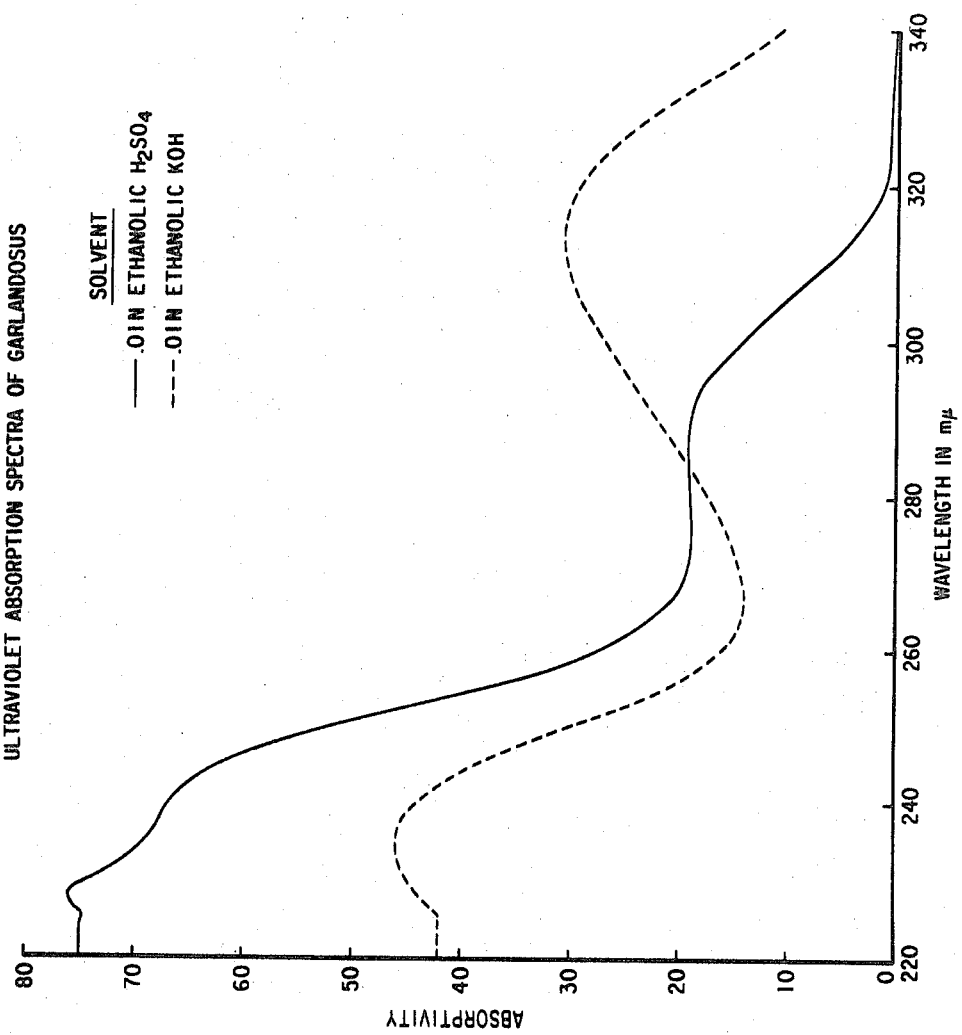

United States Patent Office 3,642,984
Patented Feb. 15, 1972

3,642,984
ANTIBIOTIC GARLANDOSUS AND PROCESS FOR PREPARING THE SAME
Malcolm E. Bergy and Clarence De Boer, Kalamazoo, Mich., assignors to The Upjohn Company, Kalamazoo, Mich.
Filed Apr. 28, 1964, Ser. No. 363,121
Int. Cl. A61k 21/00
U.S. Cl. 424—117          6 Claims

ABSTRACT OF THE DISCLOSURE

Garlandosus is a biosynthetic product obtained by culturing a garlandosus producing actinomycete in an aqueous nutrient medium under aerobic condition and is active against gram-negative bacteria.

---

Figure 1:
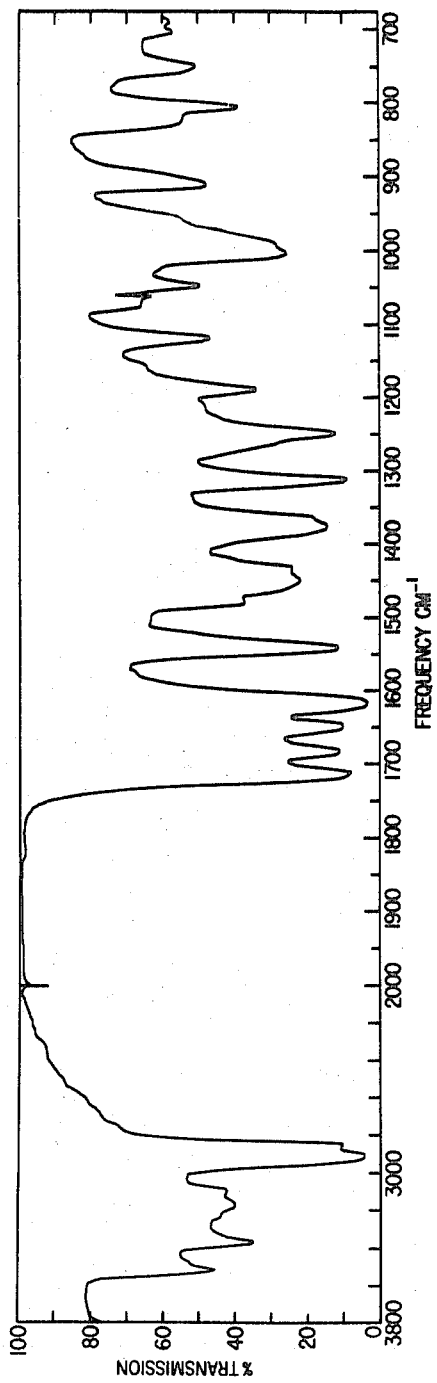

This invention relates to a novel composition of matter and to a process for the production thereof. More particularly, this invention relates to a new compound, garlandosus (U–9279), and to a process for the production thereof.

Garlandosus is a biosynthetic product obtained by culturing a garlandosus-producing actinomycete in an aqueous nutrient medium under aerobic conditions. It has the property of adversely affecting the growth of gram-positive bacteria, for example, *Staphylococcus aureus*, and *Bacillus subtilis*. It is also active against gram-negative bacteria, for example, *Salmonella pullorum*, *Proteus vulgaris*, *Escherichia coli*, *Klebsiella pneumoniae*, and *Salmonella schottmuelleri*. Accordingly, garlandosus can be used alone or in combination with other antibacterial agents to prevent the growth of, or reduce the number of, such organisms present in various environments, for example, in plants and in animals, such as mammals, birds, fish, reptiles, and humans, where the infecting microorganism is susceptible to the antibiotic. Also, it is useful in wash solutions for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating paper and fabrics; and it is useful for suppressing the growth of sensitive organisms in plate assays, and other biological media. It can also be used as a feed supplement to promote the growth of animals, for example, mammals, birds, fish, and reptiles. It is distinguished from known antibacterial agents or antibiotics by its characteristic IR and UV spectra, shown respectively in FIGS. I and II; and by lack of cross-resistance with known antibiotics, among which are penicillin, streptomycin, tetracycline, neomycin, novobiocin, erythromycin, and carbomycin.

MICROORGANISM

The actinomycete used according to this invention for the production of garlandosus has been designated as *Streptomyces althioticus* var. *garlandosus* var. nova. One of its strain characteristics is the production of garlandosus. A subculture of this variety can be obtained from the permanent collection of the Northern Utilization and Research Division, Agricultural Research Service, U.S. Department of Agriculture, Peoria, Illinois, U.S.A. Its accession number in this repository is NRRL 3109.

*Streptomyces althioticus* var. *garlandosus*, NRRL 3109, has white aerial growth which turns to gray or lavender-gray upon aging. It also has colorless vegetative growth, colorless to tan reverse, and may produce a yellow-tan or tan pigment. Microscopically this organism has short straight, open loops or open spiral sporophores. Macroscopic and microscopic observations on *Streptomyces althioticus* var. *garlandosus*, NRRL 3109, are given in the following tables:

Table I—Appearance on Ektachrome
Table II—Assimilation of Carbon Compounds in a Synthetic Medium
Table III—Cultural Characteristics
Table IV—Compares the Various Characteristics of *Streptomyces althioticus* var. *garlandosus*, NRRL 3109, with other closely related actinomycetes recorded in the literature.

TABLE I

Appearance of *Streptomyces althioticus* var. *garlandosus* on Ektachromes*

| Agar medium | Surface | Reverse |
| --- | --- | --- |
| Bennett's | Trace lavender-gray | Yellow tan. |
| Czapek's sucrose | Lavender gray | Pale, dull lavender gray. |
| Maltose tryptone | Trace lavender gray | Yellow tan. |
| Peptone iron | Colorless | Yellow. |
| 0.1% tyrosine | Very slight trace gray | Red tan. |
| Casein starch | Colorless | Pale dull tan. |

*Dietz, A., Ektachrome Transparencies as Aids in Actinomycete Classification; Annals of the New York Academy of Sciences, 60: 152, 1954.

TABLE II

Assimilation of carbon compounds in a synthetic medium by *Streptomyces althioticus* var. *garlandosus*

(Pridham, T. G., and Gottlieb, D. The Utilization of Carbon Compounds by Some Actinomycetales, as an Aid for Species Determination; Journal of Bacteriology, 56, 107: 1956).

|     |              |     |     |     |
| --- | ---          | --- | --- | --- |
|     | Control      | −   | (−) | (−) |
| 1   | D-xylose     | +   | +   | +   |
| 2   | L-arabinose  | +   | +   | (+) |
| 3   | Rhamnose     | +   | +   | +   |
| 4   | D-fructose   | +   | +   | +   |
| 5   | D-galactose  | +   | (+) | (+) |
| 6   | D-glucose    | (+) | (+) | (+) |
| 7   | D-mannose    | +   | (+) | (+) |
| 8   | Maltose      | +   | +   | +   |
| 9   | Sucrose      | (−) | (+) | (+) |
| 10  | Lactose      | +   | +   | +   |
| 11  | Cellobiose   | (+) | (+) | (+) |
| 12  | Raffinose    | (−) | (−) | (−) |
| 13  | Dextrin      | +   | +   | (+) |
| 14  | Inulin       | (−) | (−) | (−) |
| 15  | Soluble starch | (−) | (+) | (+) |
| 16  | Glycerol     | (+) | (+) | (+) |
| 17  | Dulcitol     | (−) | (−) | (−) |
| 18  | D-mannitol   | +   | (+) | +   |
| 19  | D-sorbitol   | (−) | (+) | (−) |
| 20  | Inositol     | +   | +   | +   |
| 21  | Salicin      | (+) | (−) | (−) |
| 22  | Phenol       | −   | −   | (−) |
| 23  | Cresol       | −   | −   | −   |
| 24  | Na formate   | −   | (−) | (−) |
| 25  | Na oxalate   | −   | (−) | (−) |
| 26  | Na tartrate  | −   | −   | (−) |
| 27  | Na salicylate | −  | −   | (−) |
| 28  | Na acetate   | −   | (−) | (−) |
| 29  | Na citrate   | (−) | +   | +   |
| 30  | Na succinate | (−) | (+) | (−) |

NOTE: +=Positive assimilation; −=Negative assimilation; (−)=Slight growth—no assimilation; (+)=Positive assimilation—only slight growth.

TABLE III

Cultural characteristics of *Streptomyces althioticus* var. *garlandosus*

| Medium | Aerial Growth | Vegetative Growth | Other |
|---|---|---|---|
| Plain gelatin stab | None | Colorless surface growth sinking to bottom of liquefied area. | ¼ liquefied in 4 days; ¾ liquefied in 1 month. |
| Nutrient gelatin stab | do | do | ¼ liquefied in 4 days; ¾ liquefied in 1 month. |
| Tryptone broth | Trace white on surface ring | Good surface ring dropping to base. Flocculent at base. | Indole test negative. |
| Tyrosine broth | None | Slight flocculent growth throughout. Fair flocculent growth at base. | Fair to good pink color. |
| Waksman's tyrosine agar | do | Poor colorless vegetative growth | Colorless reverse. |
| Litmus milk | Trace white | Heavy surface pellicle | Peptonization, pH 8.0. |
| Nutrient nitrate broth | Good white turning to lavender-gray-white. | Good surface ring or pellicle. Flocculent at base. | Nitrates not reduced. |
| Synthetic nitrate broth | None | Fair surface ring. Growth throughout and at base. | Do. |
| Calcium malate agar | Fair white lavender-gray | Fair colorless | Colorless reverse. |
| Peptone-iron agar | None | Heavy colorless | Do. |
| Glucose asparagine agar | None to fair pale lavender-gray | Good pale yellow | Pale yellow to lavender reverse. Trace yellow pigment. |
| Maltose tryptone agar | Trace gray turning to good lavender-gray-white. | Good yellow | Reverse at first yellow, turning to yellow tan and tan. Tan pigment. |
| Skim milk agar | White becoming cream colored in the center and white on the periphery. | Good colorless | Tan reverse. Fair casein hydrolysis. |
| Nutrient starch agar | Trace white to gray white | do | Reverse cream colored under sporulating area. Starch hydrolyzed. |
| Casein starch agar | Trace white | do | Colorless reverse. Starch hydrolyzed. |
| Czapek's sucrose agar | Gray turning to lavender pink | do | Reverse gray turning to pink-tan. |
| Bennett's agar | Gray-white turning to lavender-gray | do | Reverse cream turning to gray tan. |

TABLE IV

Comparison of *Streptomyces althioticus* var. *garlandosus* with *Streptomyces althioticus* and *Streptomyces matensis* on basis of literature data.

| Medium | S. althioticus | S. Matensis | Streptomyces althioticus var. garlandosus |
|---|---|---|---|
| Bennett's | | Growth abundant hyaline with smooth surface. Brownish gray reverse. Powdery brownish gray aerial mycelium. Some light brown soluble pigment. | Gray white aerial turning to lavender gray. Colorless vegetative. Reverse cream turning to gray tan. |
| Czapek's sucrose agar | Growth colorless to white and later light brown. Reverse purplish, frequently in later stage. Aerial mycelium, powdery white, later gray. Light brown pigment frequently, or purplish soluble pigment occasionally in later stage. | Growth fair, colorless thin with smooth surface and hyaline to light violet-gray reverse. Powdery gray aerial mycelium. Faint bluish pigment. | Colorless vegetative. Gray aerial turning lavender pink. Reverse gray turning to pink tan. |
| Glucose asparagine agar | Growth, colorless to white, later light brown with or without dull light reddish tinge. Surface glossy. Aerial mycelium scant, white. Light brown to dull reddish brown soluble pigment frequently. | Growth fair, colorless to light orange pink and pinkish reverse. Aerial mycelium light gray. On aging there appears a faint pinkish amber pigment. | Pale yellow vegetative. None to fair pale lavender gray aerial growth. Pale yellow to lavender reverse trace yellow pigment. |
| Gelatin | Scant growth without liquefaction | Partial fluidification in twelve days. Pigment absent. | ¾ liquefied in one month. No pigment. |
| Litmus milk | Peptonization. Alkaline litmus color | Peptonization and acidification | Peptonization, pH 8.0. |
| Nitrate | No reduction | No reduction | No reduction. |
| Starch hydrolysis | Almost none at 7 days | Strong | Starch hydrolyzed. |
| Optimum temperature | 27–37 | 28–37 | 28–37 on Czapek's sucrose. |
| Sporophores | Aerial mycelium bearing curved chains or coils of conidia. | Sporophores in whorls. Spore chains in closed spirals. | Sporophores straight, open loops, and open spirals. |

The new compound of the invention is produced when the elaborating organism is grown in an aqueous nutrient medium under submerged aerobic conditions. It is to be understood that for the preparation of limited amounts surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed brewer's yeast with milk solids, pancreatic digestive casein, distiller's solubles, animal peptone liquors, meat and bone scraps, and like nitrogenous sources. Combination of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to the satisfactory growth of the microorganism, for example, between about 18° and 40° C. and preferably between about 26° and 30° C. Ordinarily, optimum production of the compound is obtained in from about 2 to 10 days. The medium normally stays fairly close to neutral, or on the alkaline side, during the fermentation. The final pH is dependent, in part, on the buffers present, and in part on the initial pH of the culture medium which is advantageously adjusted to about pH 6–8 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound as long as it is such that a good growth of the microorganism is obtained.

The new compound of the invention, garlandosus, is a neutral substance whose elemental analysis indicates the empirical formula $C_{27}H_{28}N_8S_3O_{10}$. As a non-crystalline product it is soluble in most organic solvents including ethyl and amyl acetates, methylene chloride and alcohols. However, the crystalline antibiotic is relatively insoluble in water, methanol, ethanol, 1-butanol, 2-butanol, isopropanol, methyl ethyl ketone, acetone, ethyl acetate, amyl acetate, and methylene chloride. It is readily obtained in crystalline form from lower alcohols and ketones and has been crystallized from acetone, methyl ethyl ketone, methanol, ethanol, isopropanol, 1-butanol, 2-butanol and n-amyl alcohol. The crystalline product is soluble in dimethylacetamide (DMA) and is assayed by dissolving in DMA and diluting with pH 6 aqueous buffer. It is also soluble in wet methyl ethyl ketone.

In accordance with a preferred procedure for the recovery of the new compound of the invention, the whole beer is adjusted, if necessary, to a near neutral pH or below, suitably between pH 5 and 7, and filtered. A filter aid, for example, diatomite can be used. The filtrate is then extracted with a water-immiscible solvent and the new compound recovered by crystallization from the solvent phase.

The novel compound of the invention can also be recovered from harvest beers and other aqueous solutions by adsorption on a surface-active adsorbent, for example, Florisil (a synthetic silicate of the type described in U.S. Pat. 2,393,625 and sold by the Floridin Co.) decolorizing carbon, or decolorizing resin, and eluting the adsorbed material with a solvent. Any of the solvents mentioned above can be used. A suitable decolorizing resin is Permutit DR (U.S. Pat. 2,702,263).

Crystalline garlandosus can be obtained by concentrating the solvent extract, for example, methylene chloride, and then adding a small amount of a lower alcohol or ketone to crystallize the antibiotic. Recrystallization is best achieved by dissolving crystals in 1:1 ethanol-methylene chloride and then stirring the solution with activated carbon. The carbon is filtered off and washed with ethanol. The filtrate (and wash) is concentrated to approximately ⅓–½ volume and cooled to yield crystalline garlandosus.

The new compound of the invention, garlandosus, has a broad spectrum of antibacterial activities. A tube dilution spectrum was run with garlandosus on BHI broth (Brain Heart Infusion, Difco, Detroit, Mich.). Assay tubes (18 x 150 mm.) were prepared in the customary manner set out in Snell, E. E., Vitamin Methods, vol. I, Academic Press, Inc., New York, 1950, p. 327. Test organisms grown for 18 hours at 37° C. were used to inoculate the test medium at a dilution of 1–40,000. The antibacterial spectrum of garlandosus is shown in the following table:

| Test organism: | M.I.C.[1] (mcg./ml.) |
| --- | --- |
| Bacillus subtilis | 25 |
| Staphylococcus aureus | 3.12 |
| Streptococcus viridans | 6.25 |
| Diplococcus pneumoniae | 3.12 |
| Salmonella pullorum | 25 |
| Proteus vulgaris | 100 |
| Salmonella typhosa | 50 |
| Escherichia coli | 50 |
| Klebsiella pneumoniae | 12.5 |
| Salmonella schottmuelleri | 100 |

[1] M.I.C.=minimum inhibitory concentration.

The new compound of the invention, garlandosus, is active against Bacillus subtilis and can be used for treating breeding places of silk worms to prevent or minimize infections caused by this organism. It can also be used to minimize or prevent odor caused by this organism in fish and fish crates. The new compound can be used as a disinfectant on various dental and medical equipment contaminated with Staphylococcus aureus; it can also be used as a disinfectant on washed and stacked food utensils contaminated with Staphylococcus aureus. Further, garlandosus can be used to lower the bacterial count and lengthen the viability time of stored invertebrate sperm. Also, it can be used to control the bacterial growth at the site where oysters are treated to produce cultured pearls. This then promotes healing, and permits growth of the bag that protects the pearl during its three to five year growth.

The following examples are illustrative of the process and products of the present invention, but are not to be construed as limiting. All percentages are by weight and all solvent mixtures are by volume unless otherwise noted.

Example 1.—Garlandosus (A) Fermentation.—A soil stock of Streptomyces althioticus var. garlandosus, NRRL 3109, was used to inoculate a series of 500 ml. Erlenmeyer flasks containing 100 ml. of preseed medium consisting of the following ingredients:

Glucose monoyhdrate—25 grams
Cottonseed meal—40 gm.
Tap water q.s. 1 liter.

The preseed was grown for three days at 28° C. on a Gump rotary shaker operating at 250 r.p.m.

Preseed inoculum (0.5%), described above, was used to inoculate a 400-liter seed tank containing 250 liters of the following sterile seed medium:

King Corn [1]—25 grams/liter
Cottonseed meal—40 grams/liter
Lard oil—1.5 ml./liter
Tap water—Balance

[1] Liquid corn sugar, Corn Products Refining Co., Argo, Ill.

The pre-sterilzation pH of the seed medium was adjusted to 7.63 with sodium hydroxide. The seed inoculum was grown for 42 hours at a temperature of 28° C., aeration rate of 100 standard liters/min., and agitated at a rate of 280 r.p.m.

The seed inoculum, described above, was used to inoculate a 7500-liter fermentation tank containing 5500 liters of the following sterile fermentation medium:

Black strap molasses—25 grams/liter
Dextrin—40 grams/liter
Fish meal—15 grams/liter
Wheat grits [1]—15 grams/liter
Lard oil—1.5 ml./liter
Tap water—Balance

[1] Coarsely ground wheat.

The pH was adjusted to 7.3 with sodium hydroxide before sterilization. The culture was grown for 63 hours at a temperature of 28° C., aeration rate of 80 standard cubic feet/min., and agitated at a rate of 166 r.p.m. The preharvest whole broth assay against S. lutea was 386 mcg./ml. of garlandosus. The whole beer solids was about 25 gm./liter. (The assay against Sarcina lutea is conducted on agar buffered to pH 6–8 with pH 7.0 phosphate buffer [0.1 M]. A unit volume [0.08 ml.] of solution containing the material to be assayed is placed on a 12.7 mm. assay disc which is then placed on an agar plate seeded with the assay microorganism.)

(B) Extraction and purification.—The whole beer (5500 liters) from the above fermentation was filtered in a filter press with the aid of 4% diatomaceous earth. The filtered beer was extracted with ¼ vol. of methylene chloride. The extract was continuously concentrated to a volume of 18 liters at which time garlandosus separated from the solution as a white, crystalline material. These crystals (first crop) were filtered and dried. The mother liquor was added slowly to 5 vol. of Skellysolve B (isomeric hexanes) with stirring and then stirred overnight. The precipitate (second crop), a brown material, was filtered off and dried. The material balance is given in the following table:

| Process | Vol. or wgt. | Potency [1] |
| --- | --- | --- |
| Whole beer | 5,500 liters | 386 mcg./ml. |
| Clear beer | 4,850 liters | 264 mcg./ml. |
| Spent beer | 4,850 liters | 90 mcg./ml. |
| 1st crop of crystalline garlandosus | 235 grams | 1,200 mcg./mg. |
| 2nd crop of garlandosus | 595 grams | 98 mcg./mg. |

[1] S. lutea assay.

Chemical and physical properties of garlandosus

Crystalline garlandosus has the following physical and chemical properties: Melting Point: 180–183° C.

*Elemental Analysis.*—Calculated for $C_{27}H_{28}N_8O_{10}S_3$. Found (percent): C, 45.50; H, 3.78; N, 14.82; S, 12.73; O, 21.60.

Molecular weight: 708 (by isothermal distillation)
Color: White
Specific Optical Rotation: $[\alpha]_D^{25} = +37.8°$ (c., 2% in 1:1 95% ethanol:$CHCl_3$).

Solubility.—Garlandosus when non-crystalline is soluble in most organic solvents including ethyl and amyl acetates, methylene chloride and alcohols. However, the crystalline product is relatively insoluble in water, methanol, ethanol, 1-butanol, 2-butanol, isopropanol, methyl ethyl ketone, acetone, ethyl acetate, amyl acetate, and methylene chloride. The crystalline product is soluble in dimethylacetamide and also in some mixed solvents, e.g., methylene chloride-95% ethanol (1:1). The crystalline product is also soluble in wet methyl ethyl ketone.

Chemical tests:

| | |
|---|---|
| Ninhydrin—negative | Molisch—negative |
| Biuret—negative | Wegand—for enols of 1,3- |
| $FeCl_3$—negative | diketones and enediols— |
| Sakaguchi—negative | negative |
| Benedict—negative | Tollen's—positive |
| Anthrone—negative | Tommila—positive |

Ultraviolet spectrum.—The ultraviolet absorption maxima of crystalline garlandosus as reproduced in FIG. II of the drawing are as follows:

| Solvent | Max. | a |
|---|---|---|
| 25% acidic (0.01 N $H_2SO_4$) EtOH in $CH_2Cl_2$ | 288 | 19.24 |
| | 240 (sh) | 67.06 |
| 25% alkaline (0.01 N KOH) EtOH in $CH_2Cl_2$ | 312 | 30.76 |
| | 236 | 46.05 |

Infrared spectrum.—The infrared absorption spectrum of garlandosus suspended in mineral oil mull is reproduced in FIG. I of the drawing. Garlandosus shows peaks at the following wave lengths expressed in reciprocal centimeters:

| | | |
|---|---|---|
| 3520 | 1650 | 1251 |
| 3370 | 1642 | 1006 (sh) |
| 3240 (sh) | 1618 | 990 |
| 3180 (sh) | 1480 | 914 |
| 3100 | 1377 (sh) | 830 (sh) |
| 1713 | 1365 | 809 |
| 1685 | 1314 | 753 |

The characteristics of garlandosus, described above, are in good agreement with those reported in the literature for althiomycin and matamycin. See H. Yamaguchi et al., J. Antibiotics (Japan), 10A, 195 (1957); P. Margalith et al., Anti. and Chemo., 9, 71 (1959); P. Sensi et al., ibid., 9, 76 (1959). However, no process whereby althiomycin or matamycin can be produced is disclosed.

We claim:

1. A composition of matter assaying at least 15 mcg./mg. of garlandosus, a compound which:
   (a) is effective in inhibiting the growth of various gram-positive and gram-negative bacteria;
   (b) is soluble in most organic solvents including ethyl and amyl acetates, methylene chloride, and alcohols; and in its essentially pure crystalline form
   (c) is relatively insoluble in water, methanol, ethanol, 1-butanol, 2-butanol, isopropanol, methyl ethyl ketone, acetone, ethyl acetate, amyl acetate, and methylene chloride; is soluble in dimethylacetamide, wet methyl ethyl ketone, and also in some mixed solvents, e.g., methylene chloride-95% ethanol (1:1);
   (d) has the following elemental analysis: C, 45.50; H, 3.78; N, 14.82; S, 12.73; O, 21.60;
   (e) has a molecular weight of 708 by isothermal distillation;
   (f) has an optical rotation $[\alpha]_D^{25} + 37.8°$ (c., 2% in 1:1 95% ehanol:$CHCl_3$);
   (g) has a characteristic ultraviolet absorption spectrum as follows:

| Solvent | Max. | a |
|---|---|---|
| 25% acidic (0.01 N $H_2SO_4$) EtOH in $CH_2Cl_2$ | 288 | 19.24 |
| | 240 (sh) | 67.06 |
| 25% alkaline (0.01 N KOH) EtOH in $CH_2Cl_2$ | 312 | 30.76 |
| | 236 | 46.05 | and as shown in FIG. II of the drawing; and
   (h) has a characteristic infrared absorption spectrum as shown in FIG. I of the accompanying drawing.

2. A compound as defined in claim 1, garlandosus, in its essentially pure form.

3. A novel compound, garlandosus, according to claim 1 in its essentially pure crystalline form.

4. A process for preparing garlandosus, as defined in claim 1, which comprises cultivating *Streptomyces althioticus* var. *garlandosus* in an aqueous nutrient medium under aerobic conditions until substantial activity is imparted to said medium by production of garlandosus.

5. A process for preparing garlandosus, as defined in claim 1, which comprises cultivating *Streptomyces althioticus* var. *garlandosus* in an aqueous nutrient medium containing a source of assimilable carbohydrate and assimilable nitrogen under aerobic conditions until substantial activity is imparted to said medium by production of garlandosus and isolating the garlandosus so produced.

6. A process according to claim 5 in which the isolation comprises filtering the medium and then contacting the filtrate with a water-immiscible solvent for garlandosus and recovering garlandosus from the solvent extract.

References Cited

Yamaguchi et al., J. Antibiotics, Ser. A, vol. 10, No. 5, pp. 195–200 (1957).

Margalith et al., Anti and Chemo., vol. 9, No. 2, pp. 71–75 (1959).

Sewsi et al., Anti and Chemo., vol. 9, No. 2, pp. 76–80 (1959).

Cram et al., J. of Am. Chem. Soc., vol. 85, No. 10, 1963, pp. 1430–1437.

JEROME D. GOLDBERG, Primary Examiner

U.S. Cl. X.R.
195—80